US006955759B2

(12) United States Patent
Patrick et al.

(10) Patent No.: US 6,955,759 B2
(45) Date of Patent: Oct. 18, 2005

(54) POROUS DIKE INTAKE STRUCTURE FOR FISH DIVERSION

(75) Inventors: Paul H. Patrick, Milton (CA); Henry E. Kowalyk, Minesing (CA); Otto Herrmann, Ancaster (CA)

(73) Assignee: Kinectrics Inc., Toronto (CA)

( * ) Notice: Subject to any disclaimer, the term of this patent is extended or adjusted under 35 U.S.C. 154(b) by 0 days.

(21) Appl. No.: 10/621,508

(22) Filed: Jul. 18, 2003

(65) Prior Publication Data
US 2004/0200766 A1 Oct. 14, 2004

(30) Foreign Application Priority Data
Apr. 9, 2003 (CA) ............................................ 2424808

(51) Int. Cl.⁷ ................................................ E02B 8/08
(52) U.S. Cl. ........................ 210/162; 210/170; 119/219; 405/81; 405/107; 405/127
(58) Field of Search ................................ 210/154, 162, 210/170; 119/219; 405/81, 83, 107, 127

(56) References Cited
U.S. PATENT DOCUMENTS

| 1,133,768 | A | * | 3/1915 | Wartemann ................. 405/107 |
| 1,178,428 | A | * | 4/1916 | Tozier ......................... 210/162 |
| 1,213,624 | A | * | 1/1917 | Glenn .......................... 210/162 |
| 1,376,889 | A | * | 5/1921 | Kirby ........................... 405/107 |
| 1,825,169 | A | * | 9/1931 | Wyckoff ...................... 210/154 |
| 2,641,221 | A | * | 6/1953 | Sibinski et al. ............. 405/107 |
| 2,826,897 | A | * | 3/1958 | Vinsonhaler et al. ......... 405/81 |
| 4,064,048 | A | | 12/1977 | Downs et al. |
| 4,169,792 | A | | 10/1979 | Dovel |
| 4,415,462 | A | | 11/1983 | Finch et al. |
| 4,526,494 | A | * | 7/1985 | Eicher ......................... 210/162 |
| 4,594,024 | A | | 6/1986 | Jenkner et al. |
| 5,123,780 | A | | 6/1992 | Martinsen |
| 5,385,428 | A | | 1/1995 | Taft, 3rd et al. |
| 6,051,131 | A | | 4/2000 | Maxson |
| 6,457,436 | B1 | | 10/2002 | Truebe et al. |
| 6,474,265 | B1 | * | 11/2002 | Powell ......................... 119/219 |

* cited by examiner

Primary Examiner—Christopher Upton
(74) Attorney, Agent, or Firm—Dimock Stratton LLP; Mark B. Eisen

(57) ABSTRACT

A structure for diverting fish away from water intakes comprises a porous dike having a bottom portion, a central portion, and a top portion, the top portion preferably being submerged a short distance below the surface, and the central portion having flow passages. In a preferred embodiment, the top and bottom portions comprise solid blocks and the flow passages in the central portion are lined with zebra mussel resistant sleeves to minimize clogging. Preferably the sleeve can be readily replaced as desired.

15 Claims, 2 Drawing Sheets

POROUS DIKE INTAKE STRUCTURE FOR FISH DIVERSION

FIELD OF THE INVENTION

This invention relates to fish diversion from water intakes of dams, power plants and other industrial systems requiring large quantities of water. This invention also relates to the prevention of clogging by zebra mussels or related biofouling organisms.

BACKGROUND OF THE INVENTION

In the prior art there are disclosed numerous systems for diverting fish and other aquatic life from water intakes. Most of these systems deal with different intake designs. U.S. Pat. No. 4,064,048 issued Dec. 20, 1977 to Downs et al., which is incorporated herein by reference, teaches the use of louvers, U.S. Pat. No. 6,051,131 issued Apr. 18, 2000 to Maxson, which is incorporated herein by reference, teaches the use of submerged intake screens, U.S. Pat. No. 5,385,428 issued Jan. 31, 1995 to Taft, 3rd et al., which is incorporated herein by reference, teaches the use of a plane screen, U.S. Pat. No. 4,415,462 issued Nov. 15, 1983 to Finch, et al., which is incorporated herein by reference, teaches the use of a self-cleaning screen, U.S. Pat. No. 6,457,436 issued Oct. 1, 2002 to Truebe, et al., which is incorporated herein by reference, teaches the use of paddlewheels, and (U.S. Pat. No. 4,594,024 issued Jun. 10, 1986 to Jenkner, et al., which is incorporated herein by reference, teaches the use of an offshore intake).

For example Downs, et al. describe a water flow system for diverting fish and debris using a plurality of vertically extended, laterally spaced louver members. A diversion structure is located at one end of the louver system before diverting fish back into the water. U.S. Pat. No. 4,169,792 issued Oct. 2, 1979 to Dovel, which is incorporated herein by reference, describes a water intake device comprising a cylindrical rotatable screen which is designed to guide or carry fish and debris away from entering the screen. Finch, et al teaches a self-cleaning screen system for use at hydroelectric stations whereas Taft, 3rd et al., teach a fish diversion apparatus which uses a plane screen to divert fish from different intake flows. None of these inventions teach a porous dike concept or means of excluding fish using small passages through the intake structure. There are also no means of preventing attachment due to mollusks such as zebra mussels or related species through these passages.

Similarly, patents on porous dikes or breakwaters do not teach means of reducing fish passage or ways of preventing attachment from zebra mussels and related species. For example, U.S. Pat. No. 5,123,780 issued Jun. 23, 1992 to Martinsen, which is incorporated herein by reference, teaches the use of prefabricated concrete blocks for constructing a breakwater or dike not an water intake for reducing fish passage or preventing mussel attachment.

The recent introduction of zebra mussels to North American waterways is problematic for porous dikes and related systems due to clogging resulting from mussel attachment (Claudi and Mackie 1976). There are also prior art methods for controlling zebra mussels, however, some of these are potentially harmful to the environment, and are not necessarily compatible with prior art fish diversion systems. Recent USEPA 316B environmental legislation as part of the Clean Water Act makes it imperative that a solution be found.

BRIEF SUMMARY OF THE INVENTION

It is an object of the present invention to provide a means of diverting fish and other aquatic life away from water intakes without being subject to clogging by zebra mussels, algae, or other aquatic organisms.

According to a preferred embodiment of this invention, a porous dike is constructed around a water intake, and comprises a bottom portion of solid blocks, a central portion of blocks with flow passages, and a top portion of solid blocks. The top of the top portion is 2–3 feet below the water surface. The flow passages in the central portion are 8–20 inches in diameter and are provided on the inside with a zebra mussel resistant material or coated with such a material. Optionally, the flow passage may consist of a double-walled structure, with the inner structure being removable. The removable inner portion thereby allows for ready removal of any adherent zebra mussels. The time between changes of the inner structure is increased by either making it of a zebra mussel resistant material or by coating it with such a material. This will allow flow through the structure as part of the intake service water to an industrial user. Although it would still be possible for fish to swim through or over the porous dike, the behavioural characteristics of fish are such that they would generally avoid doing so. Many schooling species exhibit avoidance responses based on space perception of confined areas (6 to 30 inches, preferably 8 to 20 inches).

DESCRIPTION OF THE DRAWINGS

In drawings which illustrate by way of example only preferred embodiment of the invention.

DETAILED DESCRIPTION OF THE INVENTION

Figure 1:
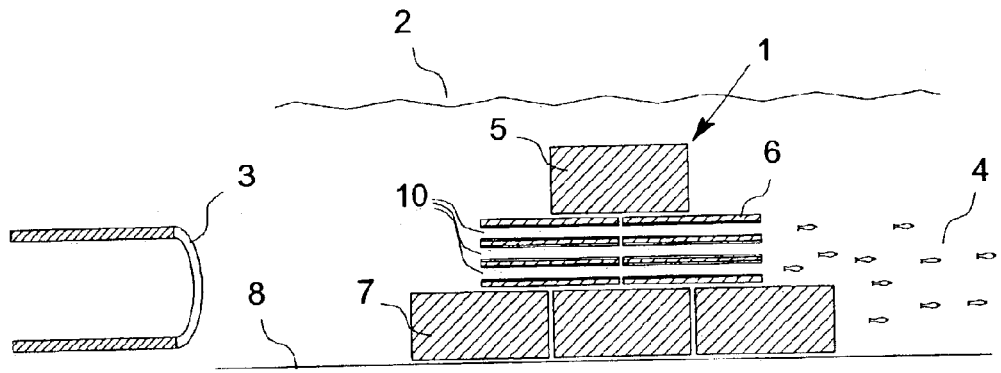
FIG. 1 is a cross-sectional view showing a water intake protected by a porous dike constructed in accordance with the present invention.

A preferred embodiment of the present invention will now be described with reference to the drawings. Referring now to FIG. 1, a water intake 3 collects water which must flow either over or through submerged dike 1 of the invention. The dike 1 of the invention, in one preferred embodiment, comprises a top portion 5 below the water surface 2, a central portion 6, and a bottom portion 7 which rests on the bottom 8 of the lake or other body of water. The fish 4 are kept away from water intake 3 by the dike 1.

Figure 2:
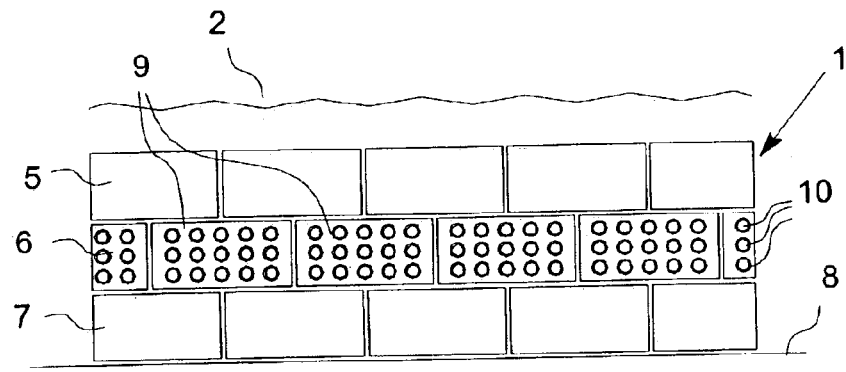
FIG. 2 is an elevational view of a section of the porous dike of FIG. 1.

Referring now to FIG. 2, a cross-section of the porous dike 1 is shown. The bottom portion 7 comprises water-impermeable, preferably solid, blocks; the central portion 6 comprises blocks 9 with flow passages 10, and the top portion 5 comprises generally opaque blocks which will appear to a fish as an obstruction. Preferably the blocks in the top portion 5 are solid, for ease of manufacture and stability in the dike 1. The upper limit of the top portion 5 is preferably disposed two to three feet below the water surface 2.

The flow passages 10 in the central portion 6 are preferably 8 to 20 inches in diameter and are preferably provided (for example lined or coated) with a zebra mussel-resistant material. Said porous dike 1 has the effect of keeping fish away from the intake because fish are reluctant to swim over submerged objects that are close to the surface, and are reluctant to swim into confined spaces such as the flow passages in the central portion of blocks 6. The flow passages 10 through the blocks in the central portion 6 preferably comprise pipes 13 into which are inserted sleeves 11, which are formed from, dipped or otherwise coated in a zebra mussel-resistant material (for example a silicon-based curable coating) and are large enough to allow small mats of algae to pass through, while larger mats, due to their weight will tend to remain at the bottom portion 7 where there are no holes to clog, particularly in the autumn when the mats start to fall off of their rock substrates.

Figure 3:
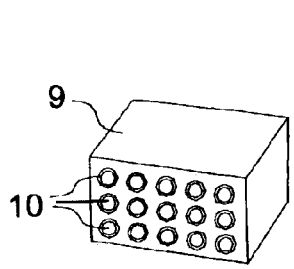
FIG. 3 is a perspective view of a block with flow passages in the dike of FIG 1.

Referring now to FIG. 3, blocks 9 in the central portion may consist of prefabricated concrete, or any other suitable material, and have openings 10 which extend through the dike 1 to accommodate the pipes 13 and inner sleeves 11 which are zebra mussel-resistant (or coated with a zebra mussel-resistant lining), which in turn provide flow passages 10 that allow water flow in addition to the flow which passes over the top of the structure.

Figure 4:
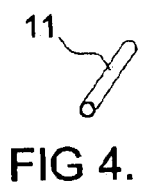
FIG. 4 is a perspective view of a flow passage liner sleeve in the block of FIG. 3.
Figure 5:
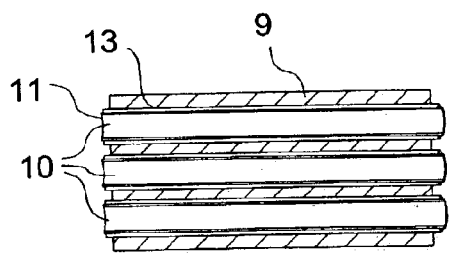
FIG. 5 is a cross-sectional view of a further embodiment of the block of FIG. 3 showing removable flow passage liner sleeves.

Referring now to FIG. 4, sleeves 11 are preferably composed of or coated with a material coating which resists adhesion by zebra mussels. The sleeves 11, which may be formed from plastic, are used to line the flow passages 10 in the blocks 9 of the central portion 6, thereby reducing the clogging of said passages by zebra mussels. These sleeves may be either flush with the porous dike or can extend beyond the porous faces (for example as shown in FIG. 5), but should not be shorter than the openings in the blocks 9. Otherwise zebra mussels could still readily clog the ends of the flow passages 6.

The sleeves 11 are thus preferably removable, while, the pipes 13 may be permanently adhered to the blocks 9 (for example cast with the blocks 9), as shown in FIG. 5. The sleeve 11 can thus be removed at intervals and replaced by a fresh sleeve 11 in order to optimize flows without replacing the entire structure. Use of a zebra mussel resistant material or coating increases the time between replacements.

Alternatively, the pipe 13 can be composed of, or the inner wall of the pipe 13 can be coated with a coating which resists adhesion by zebra mussels.

In operation, the desired number of courses of blocks are laid to form the bottom portion 7. Preferably a clearance is provided between the dike 1 and the intake 3, as shown in FIG. 1. This ensures that water can continue to flow into the intake 3 even if the dike 1 becomes clogged, particularly if the upper limit of the dike 1 is below the surface of the water.

If formed from concrete or a like solid material, the blocks may be laid without the use of an adhesive or mortar. The desired number of courses of blocks 9, which have been preferably pre-cast from concrete or the like, are laid on top of the bottom portion 7 to form the middle portion 6, and likewise the desired number of courses of blocks are laid to form the upper portion 5. Preferably the upper limit of the dike 1 is submerged to a lower limit of about two to three feet, but this is optional.

The zebra mussel resistant sleeves 11 are installed in the flow passages 10 of pipes 10 such that at a future date, they can be replaced. It is expected that the zebra mussel-resistant material or coating will last many years before being rendered ineffective by the environmental chemistry and by aging.

Figure 6:
FIG. 6 is a perspective view of an alternative embodiment of the liner having an angle at one end.
Figure 7:
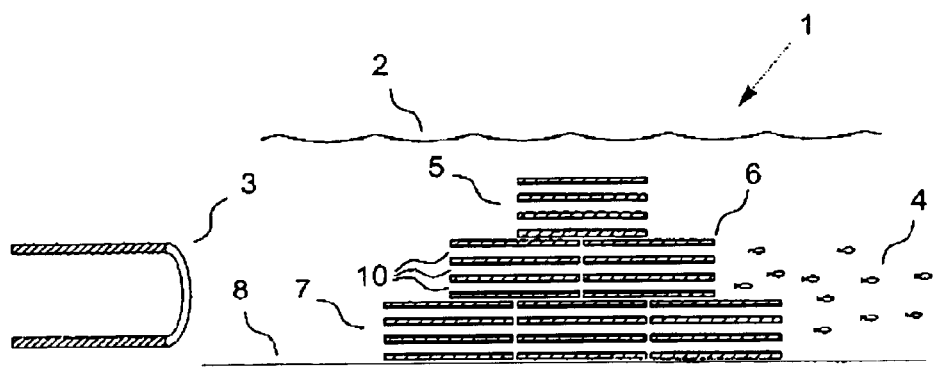
FIG. 7 is a cross-sectional view showing a water intake protected by a porous dike constructed in accordance with an alternative embodiment of the present invention.
Figure 8:
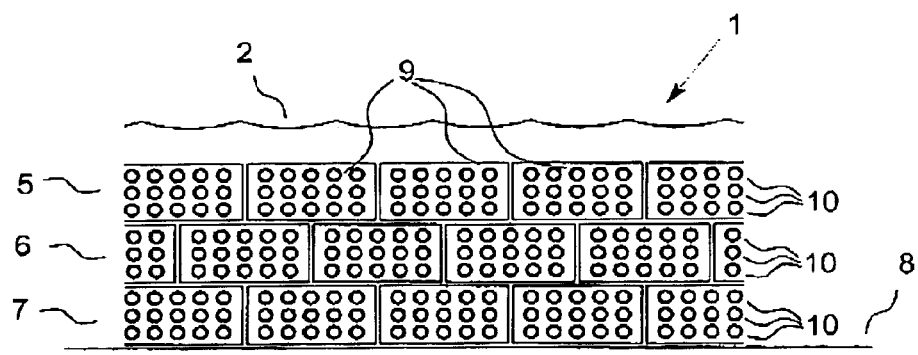
FIG. 8 is an elevational view of a section of the porous dike of FIG. 7.

Referring to FIG. 6, another embodiment is shown wherein one end of a sleeve 21 (the end opposite the intake 3) is oriented at an angle, preferably at about a 45 degree angle, with respect to the sleeve axis, to further discourage the entry of fish. Although such sleeves 21 can be installed at various different orientations around the sleeve axis, it may be preferable for the angled end to face downward as it will then be less likely to accumulate debris. In addition to having the angled end on the sleeves 21, the pipes could also have an angled end (not shown). If the sleeves and the pipes have angled ends, it would then be possible to have angled end on both ends of each flow passage and still be able to insert the sleeves into the pipes.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A structure for diverting fish in a body of water away from at least one water intake comprising:
   a porous dike formed by a plurality of blocks having a bottom portion, a central portion, and a top portion,
   the central portion having a plurality of elongated flow passages, and comprising openings large enough to permit a flow of water through the dike and large enough that fish can pass through the passages, but said flow passages being sufficiently confined spaces but to present an aversion to fish, so that fish avoid passing through the passages.

2. The structure of claim 1 wherein the openings have a width ranging from about 6 inches to about 30 inches.

3. The structure of claim 1, wherein said bottom portion comprises solid blocks.

4. The structure of claim 1, wherein said top portion comprises solid blocks.

5. The structure of claim 1, wherein said bottom portion comprises blocks having flow passages.

6. The structure of claim 1, wherein said top portion comprises blocks having flow passages.

7. A structure for diverting fish away from at least one water intake comprising:
   a porous dike having a bottom portion, a central portion, and a top portion,
   the central portion having flow passages comprising openings large enough to permit a flow of water through the dike but small enough to present an aversion to fish,
   wherein each of said flow passages is lined with at least one sleeve.

8. The structure of claim 7, wherein said at least one sleeve is composed of a material which is resistant to adhesion by zebra mussels.

9. The structure of claim 7, wherein said at least one sleeve is coated with a material which is resistant to adhesion by zebra mussels.

10. The structure of claim 7, wherein an end of at least one of said flow passages is disposed at an angle relative to an axis of the flow passage.

11. The structure of claim 10, wherein the end of the at least one of said flow passages is disposed at a 45 degree angle.

12. The structure of any one of the preceding claims, wherein at least one of said flow passages comprises a pipe.

13. The structure of any one of claims 1 to 11, wherein an upper limit of the structure is submerged.

14. The structure of claim 12, wherein an upper limit of the structure is submerged.

15. A structure for diverting fish away from at least one water intake comprising: a porous dike formed by a plurality of blocks having a bottom portion, a central portion and a top portion, at least one of the portions having a plurality of elongated flow passages therethrough comprising openings large enough to permit a ready flow of water through the dike, but small enough to present an aversion to fish due to perception rather than actual physical limitations.

* * * * *